(12) United States Patent
Li et al.

(10) Patent No.: US 10,402,733 B1
(45) Date of Patent: Sep. 3, 2019

(54) ADAPTIVE ENSEMBLE WORKLOAD PREDICTION MODEL BASED ON MACHINE LEARNING ALGORITHMS

(71) Applicant: EMC Corporation, Hopkinton, MA (US)

(72) Inventors: Sanping Li, Beijing (CN); Yu Cao, Beijing (CN); Shamail Tahir, North Grafton, MA (US); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 552 days.

(21) Appl. No.: 14/741,928

(22) Filed: Jun. 17, 2015

(51) Int. Cl.
*G06N 3/08* (2006.01)
*G06N 5/04* (2006.01)
*G06N 20/00* (2019.01)

(52) U.S. Cl.
CPC ............... *G06N 5/04* (2013.01); *G06N 20/00* (2019.01); *G06N 3/08* (2013.01)

(58) Field of Classification Search
None
See application file for complete search history.

(56) References Cited

PUBLICATIONS

Dela Rosa, et al., Boosted ranking models: a unifying framework for ranking predictions, Knowl Inf Syst (2011) 30: pp. 543-568.*
Hu, et al., Efficient Resources Provisioning Based on Load Forecasting in Cloud, The Scientific World Journal, vol. 2014, Article ID 321231, pp. 1-12.*
Dela Rosa, et al., Boosted ranking models: a unifying framework for ranking predictions, Knowl Inf Syst (2011) 30: pp. 543-568 Year: 2011) .*
Hu, et al., Efficient Resources Provisioning Based on Load Forecasting in Cloud, The Scientific World Journal, vol. 2014, Article ID 321231, pp. 1-12 (Year: 2014).*
P. Mell et al., "The NIST Definition of Cloud Computing," U.S. Department of Commerce, Computer Security Division, National Institute of Standards and Technology, Special Publication 800-145, Sep. 2011, 7 pages.

\* cited by examiner

*Primary Examiner* — Wilbert L Starks
(74) *Attorney, Agent, or Firm* — Ryan, Mason & Lewis, LLP

(57) ABSTRACT

Workload data associated with past execution of an application by a computing system is obtained. Two or more prediction models are trained using the obtained past workload data. A weight is assigned to each of the two or more trained prediction models. The two or more weighted prediction models are combined to form an ensemble prediction model configured to predict, in real-time, workload associated with future execution of the application by the computing system.

20 Claims, 5 Drawing Sheets

300

400

ADAPTIVE ENSEMBLE WORKLOAD PREDICTION MODEL BASED ON MACHINE LEARNING ALGORITHMS

FIELD

The field relates generally to computing environments, and more particularly to workload prediction in such computing environments.

BACKGROUND

Workload prediction is critical to intelligent data center functions, such as management and orchestration (M&O), as well as resource scheduling. This is because it is important for system administrators to properly manage and allocate resources for future demand in order to maintain quality of service levels in the data center (which are typically contractually agreed upon between the data center service provider and tenants of the data center via a service level agreement).

Advanced workload prediction has resorted to machine learning techniques. However, in data centers or cloud platforms, time-series application workloads often shift dramatically over time, invalidating a common assumption, held by common machine learning models, that the underlying process generating the data is stationary and that the data points are independent and identically distributed.

This issue is also known as concept drifting in machine learning. Concept drifting means that the statistical properties of a target variable change over time in unforeseen ways, which results in less accurate predictions produced as time passes.

SUMMARY

Embodiments of the invention provide techniques for improved workload prediction in a computing environment.

For example, in one embodiment, a method comprises the following steps. Workload data associated with past execution of an application by a computing system is obtained. Two or more prediction models are trained using the obtained past workload data. A weight is assigned to each of the two or more trained prediction models. The two or more weighted prediction models are combined to form an ensemble prediction model configured to predict, in real-time, workload associated with future execution of the application by the computing system. In a further embodiment, workload data associated with current execution of the application by the computing system is obtained. The current workload data is applied to the ensemble prediction model formed. An output is generated from the ensemble prediction model representing a predicted future workload for execution of the application by the computing system. The predicted future workload is utilized to automatically make a decision regarding the computing system.

Advantageously, illustrative embodiments provide an adaptive ensemble prediction model based on machine learning algorithms to perform real-time workload prediction in a data center or cloud platform. The model is capable of handling concept drifting in non-stationary time-series workload data with a dynamic optimized combination of a set of independent learning algorithms.

These and other features and advantages of the invention will become more readily apparent from the accompanying drawings and the following detailed description.

DETAILED DESCRIPTION

Figure 1:
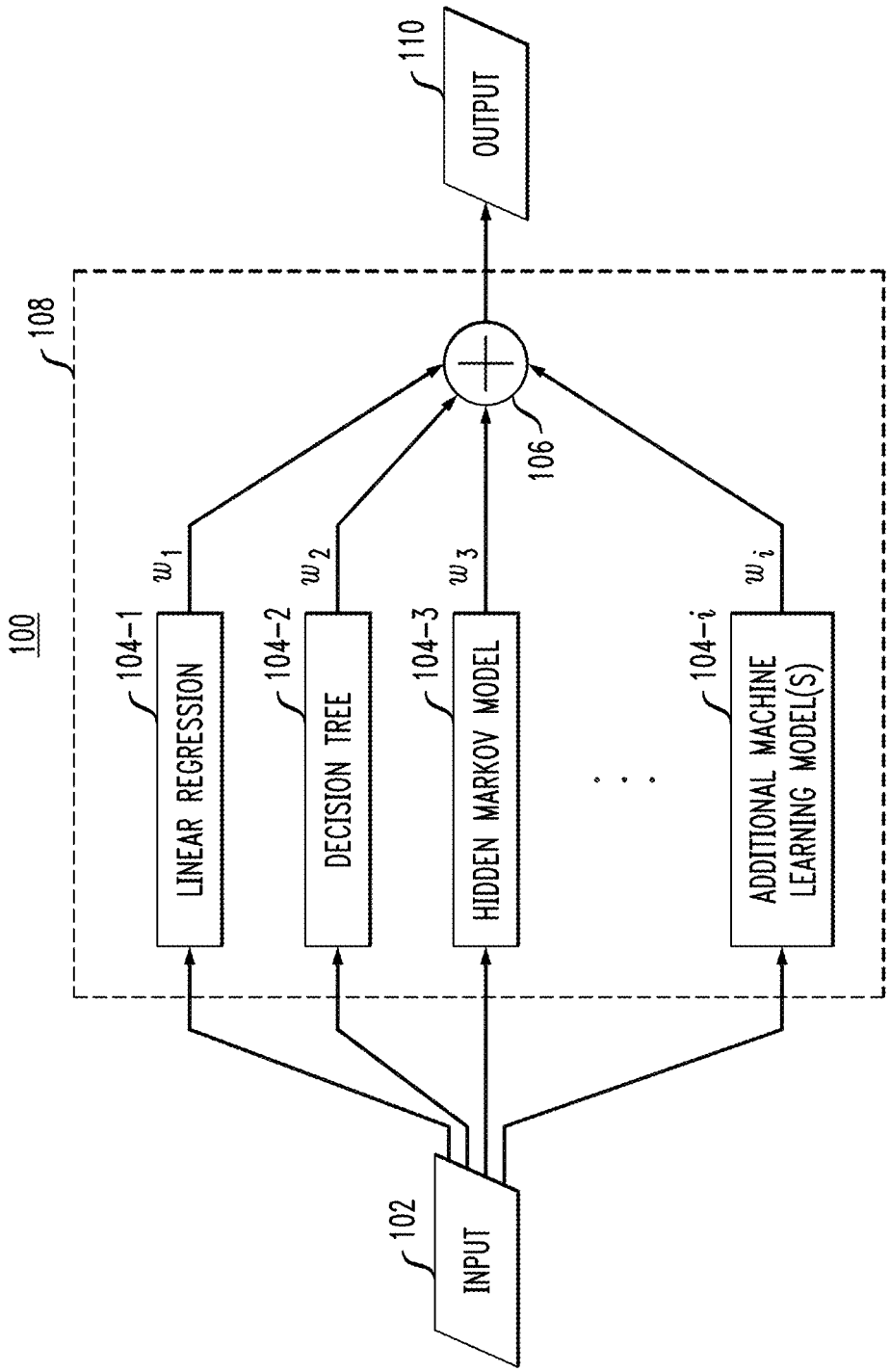
FIG. 1 illustrates an ensemble learning model, according to an embodiment of the invention.

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "workload" refers to the amount of work that a computer system has been given to do at a given time. For example, in a cloud platform environment (which is how most state-of-the-art data centers are implemented), workload can be viewed as individual capabilities and units of work that make up a discrete application hosted by the data center. An "application" refers to one or more software programs designed to perform one or more functions.

As mentioned above in the background section, existing workload prediction approaches experience concept drifting due to non-stationary workload data. Therefore, contrary to the stationary case, it is realized herein that the prediction model has to keep learning and adapting as new samples arrive.

To address these and other drawbacks with existing approaches, illustrative embodiments conduct workload prediction using a combination of different models, that is, an adaptive ensemble prediction model based on learning algorithms. Examples of machine learning algorithms include, but are not limited to, linear regression, decision tree, and hidden Markov models. The ensemble learning builds upon other machine learning algorithms by combining models. Illustrative embodiments have proven that such a combination can be more powerful and accurate than any of the individual models.

To construct the ensemble model, a number of independent prediction models are generated, each of which is individually trained. After training, these individual models are combined in an ensemble model. The output of the ensemble model is a weighted linear combination of the outputs of the individual models.

Formally, we have a prediction model $f_i(y|x)$, an estimate of the probability of output y given the input x. For a set of independent models, $i=\{1, 2, \ldots, T\}$, the ensemble output estimate is:

$$\bar{f}(y|x) = \sum_{i=1}^{T} w_t f_t(y|x)$$

The notation shows the possibility of a non-uniformly weighted average. The models often have different accuracies on the input data, thus a non-uniform combination can give more accurate prediction than a uniform combination. An example of the ensemble model according to one illustrative embodiment is shown in FIG. 1.

As shown in system 100, input (workload data) 102 is provided to a plurality of independent machine learning models 104-1, 104-2, 104-3, ..., 104-i. In this example, the models comprise a linear regression model (104-1), a decision tree model (104-2), a hidden Markov model (104-3), and one or more additional machine learning models 104-i. Other statistical classifiers can be used. The outputs of the independent models are respectively weighted ($w_1$, $w_2$, $w_3$, ..., $w_i$), and then linearly combined in linear combiner 106. The output 110 of the ensemble model (denoted as 108 comprising 104-1, 104-2, 104-3, ..., 104-i, and 106) is a weighted linear combination of the outputs of the individual models.

The input 102 includes information on current resource usage by instances and statistics on a workload running in these instances, while the output 110 is the number of instances (N). The resource usage normally refers to CPU (central processing unit) utilization (a), memory consumed (b), and network throughput (c). The workload statistics, given a web service running in the instances, refers to the number of user requests processed per unit time (which can be obtained from the application logs), and other measurements, for example, the periodicity (d) and burstiness (e) of the workload, calculated with the current user request number and historical numbers within the specific time window. The periodicity can be measured by auto-correlation, and the burstiness can be measured using entropy. Briefly, the input 102 is a series of numbers [a, b, c, d, e]. Specifically, classification methods such as the decision tree might perform better with discrete data; in such case, the discretization is needed before feeding inputs to the classification model. The output from each learning model is the predicted number of instances. With a group of weights ($w_1$, $w_2$, $w_3$, ..., $w_i$), the linear combiner 106 calculates the final output 110. For example, if we use equal weights for all learning models, the output 110 is the average of instance numbers.

Consider a more specific example. Given 5 learning models (104), their outputs are 10, 11, 12, 11, and 10, respectively, where the number 10 means the first learning model considers 10 instances are needed for the web services running with performance guarantees. Assume that the weight group learned during building this ensemble model 108 is (0.1, 0.15, 0.25, 0.2, 0.3), then the final output is: 10×0.1+11×0.15+12×0.25+11×0.2+10×0.3=10.85≈11. That is, the ensemble model considers that 11 instances are needed based on current workload.

As will be further illustrated and described herein, such an ensemble model approach to workload prediction has advantageous effects in a wide variety of implementations. By way of example only, we have validated the effectiveness of the ensemble model approach in a web (as in World Wide Web implemented on the Internet) application scenario. However, it is to be understood that such an approach can be implemented in many scenarios other than a web application scenario.

In the web application scenario, a tenant consumes the virtual resource in the cloud platform and runs his applications and services. The appropriate configuration of virtual resources is fundamental to meet the service level requirements in terms of performance, availability, capacity, etc., and to satisfy the experience of the user of the application (and any service level agreement). But, with existing approaches, it is difficult to determine ever-changing characteristics attributable to user behavior and application behavior via batch learning, which would lead to workload changes over time.

Traditional stationary machine learning algorithms cannot provide a precise workload prediction when considering a large number of instances with significant runtime hours in the cloud platform. A stable learning model does not have the capability to adapt to concept drifting present in an in-coming data stream.

An adequate dataset, including the training portion and testing portion, could be used to build a learning or prediction model that performs relatively well when new examples arrive. However, no individual model can execute well in every situation such as, by way of example only, changes in user behavior patterns, ever-emerging applications and services, etc.

Thus, in accordance with illustrative embodiments, an adaptive ensemble prediction model based on machine learning algorithms is provided to predict the workload of the tenant's applications in real-time. As will be explained, multiple machine learning algorithms are evaluated in parallel with historical data over a specified time-window constantly, and then a dynamic optimized combination of learning algorithms is constructed in order to handle concept drifting in time-series workload data. The model design is shown in FIG. 2.

Figure 2:
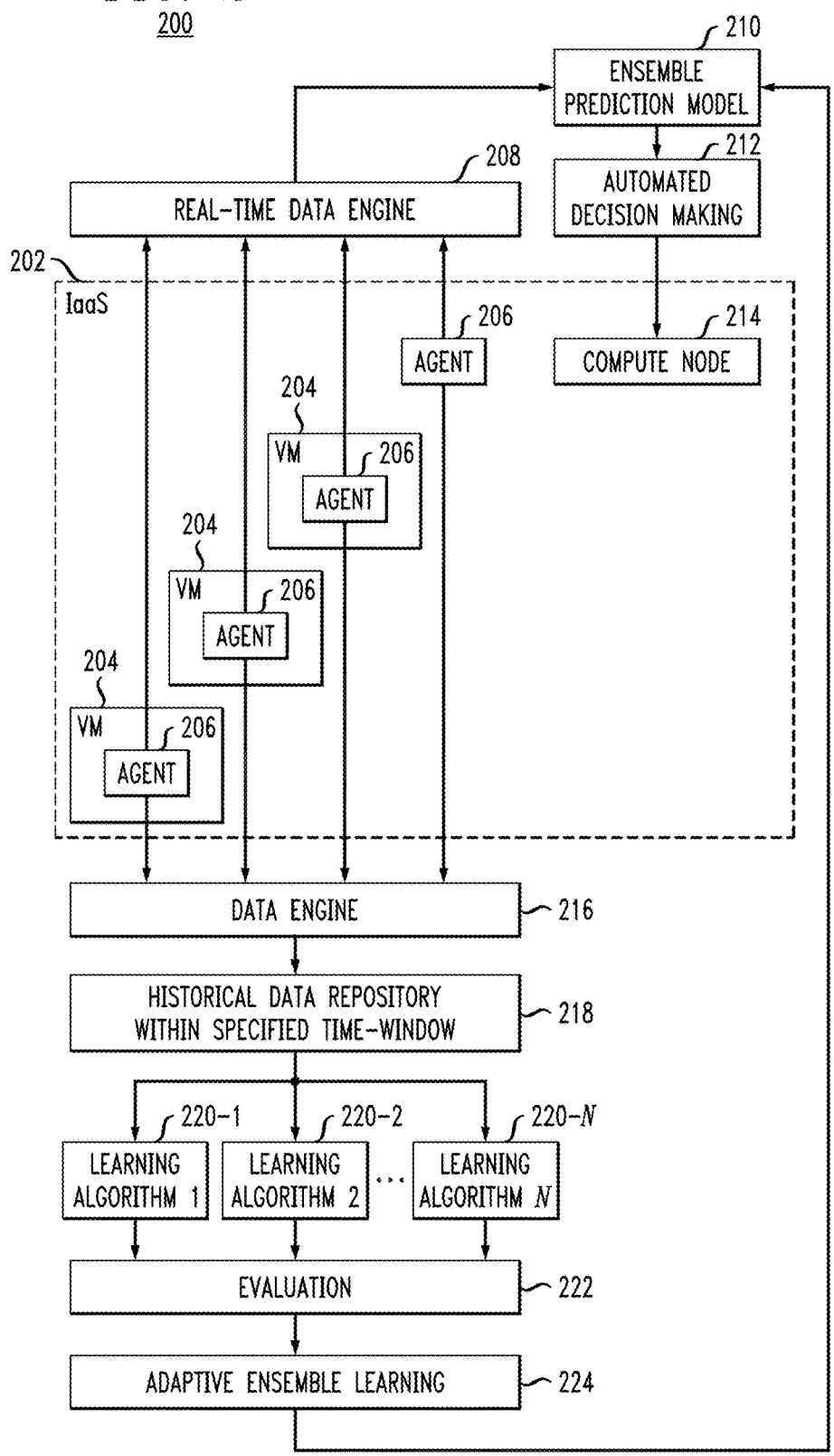
FIG. 2 illustrates a real-time workload prediction system, according to an embodiment of the invention.

As shown, FIG. 2 illustrates a real-time workload prediction system 200 according to an illustrative embodiment. System 200 comprises an Infrastructure-as-a-Service (IaaS) layer 202. As is known, IaaS is one of the service models of the cloud computing paradigm. As with all cloud computing services, IaaS provides access to computing resources in a virtualized environment (one or more clouds) via a public network such as the Internet. In the case of IaaS, the computing resource provided as part of the service is virtualized hardware, i.e., computing infrastructure. The features typically offered include, but are not limited to, virtual server space (instantiating virtual machines or VMs), network connections, bandwidth, Internet Protocol (IP) addresses, and load balancers. Physically, the hardware resources include, but are not limited to, servers and networks typically distributed across multiple data centers. The cloud provider is responsible for maintaining the data centers, while the tenant is given access to the virtualized resources in order to build their own application-specific platforms. Thus, the IaaS approach provides a plurality of clouds on-demand that form a plurality of data centers (e.g., software defined data centers or SDDCs).

As further shown system 200, the IaaS layer 202 is configured to provide a plurality of VMs 204 and a plurality of agents 206. The system 200 also includes a real-time data engine 208, an ensemble prediction model 210, an automated decision making module 212, a compute node 214 (as part of the IaaS layer 202), a data engine 216, a historical data repository 218, a plurality of learning algorithms 220-1, 220-2, . . . , 220-N, an evaluation module 222, and an adaptive ensemble learning module 224.

System 200 performs adaptive ensemble learning and real-time prediction according to an illustrative embodiment in several main steps including: data acquisition; ensemble learning; adaptive ensemble learning; real-time workload predicting; and automated decision making.

In the data acquisition step, agents 206 located inside the cloud platform (IaaS 202) and running instances collect resource usage and status data from the VMs and the platform itself, and then send the collected data out to data engine 216 with a pre-defined time interval. Alternatively, the data can be sourced from the repository of other monitoring tools and functions (e.g., Nagios and OpenStack Ceilometer). Data engine 216 then conducts any necessary data cleaning on the collected raw data (e.g., convert the raw data received to a unified structured format) and then pushes the cleaned data to historical data repository 218.

In the ensemble learning step, it is to be understood that users can define time-series window length to adjust the learning and prediction cycles. Alternatively, the window lengths can be recommended by certain approaches learning from the historical effect statistics. Users can define the specific set of machine learning algorithms 220-1, 220-2, . . . , 220-N to be leveraged in the ensemble learning step. Users can also define the weight of each machine learning algorithm leveraged. Alternatively, the weights can be recommended by certain approaches learning from the historical effect statistics. When the time-series workload data accumulates to a certain length of time, i.e., the specified time-window, the data is fed into the multiple learning algorithms 220-1, 220-2, . . . , 220-N in parallel.

Evaluation module 222 performs evaluation via comparison of prediction accuracy. Normally, the historical data set is split into two parts, the training set and testing set. When training prediction models, the training set of historical data including resource usage, statistics, as well as the corresponding instance number, $[a, b, c, d, e, N]_{training}$, is fed into each learning algorithm to build the prediction model. The testing data is used to evaluate the prediction accuracy of each model. For example, given the testing data $[a', b', c', d', e', N']_{testing}$, $[a', b', c', d', e']$ is fed into one prediction model to get a prediction instance number $N'_P$. So we will get a group of prediction results $(N'_{P1}, N'_{P2}, N'_{P3}, N'_{P4}, N'_{P5})$. By comparing $(N'_{P1}, N'_{P2}, N'_{P3}, N'_{P4}, N'_{P5})$ with $N'$, we get an evaluation of accuracy for all prediction models. This is the task done by the evaluation module 222.

Next, the evaluation information, as well as the distribution of data predicted correctly and incorrectly, are used to create the weight for each prediction model. Generally, the initial weights of models are set equally. Thus, an ensemble learning model is formed. It is to be understood, however, that this is one illustrative method for building the ensemble model and other alternative methods may be employed given the teachings herein.

Furthermore, it is to be appreciated that the data set keeps changing over time, that is, concept drift, very likely leading to changes in the prediction model built with the data set, and also changes in the weights. Thus, a new ensemble model is formed that is adapted to the new characteristics of data set.

Accordingly, the ensemble learning step is used to build the optimized learning model with the given historical workload data. As explained above, the entire data set is split into a training set and a testing set. The combination of multiple algorithms with variant weights is the output of the ensemble learning step. The capability of openness and extensibility brought from the ensemble learning method supports the changing of candidate learning algorithms.

In the adaptive ensemble learning step (module 224), if the ensemble learning model built with data within the current time-window is different from the previous one, the new learning model replaces the old one to perform the real-time prediction. Both the ever-changing user behavior and application behavior would lead to the non-stationary characteristics hidden in the workload data, i.e., the issue of concept drifting in the time-series data.

In the real-time workload predicting step, an agent 206 sends out the real-time resource usage and status data to real-time data engine 208 with a higher frequency, in comparison with the sending frequency of the historical data. The prediction model 210 built from the historical data in the adaptive ensemble learning step, as explained above, performs real-time data processing over the data received from real-time data engine 208.

In the automated decision making step, based on the predicted future workload provided by the ensemble prediction model 210, a changing plan on resource configuration and allocation in the cloud platform is generated automatically, based on the tenant's specific purpose, by module 212. The resource changing decisions could be sent to the compute node 214 or an orchestration node (not expressly shown) in the cloud platform 202 to perform operations (to implement the changes).

For example, as mentioned above, the output of model 210 is the number of expected instances. Module 212 generates decisions on resource adjustment based on the output from model 210, the current instance number, and information on resource consumption. If module 212 generates a scaling up decision, for example, launching a new instance running the web service on a certain host, the compute node 214 would operate to start a new instance.

The adaptive ensemble learning model according to illustrative embodiments is built to handle concept drifting in the non-stationary time-series workload data. The optimized combination of candidate learning algorithms with different weights is obtained from the historical observations within the time-window. Such constant observation in the form of the time window constitutes a series of ensemble learning models dynamically employed to adapt to changing patterns hidden in the time-series observations. In comparison, the static prediction model built from the single algorithm can only produce more and more prediction errors.

Illustrative embodiments focus on deriving real-time workload predictions from current and historical observations in the cloud platform, as well as micro-services (pods) in general. This is beneficial for tenants to implement the automated decision making on virtual resource configuration, so as to satisfy the ever-changing performance requirements of applications and services, and meanwhile, minimize the resource consumption.

Figure 3:
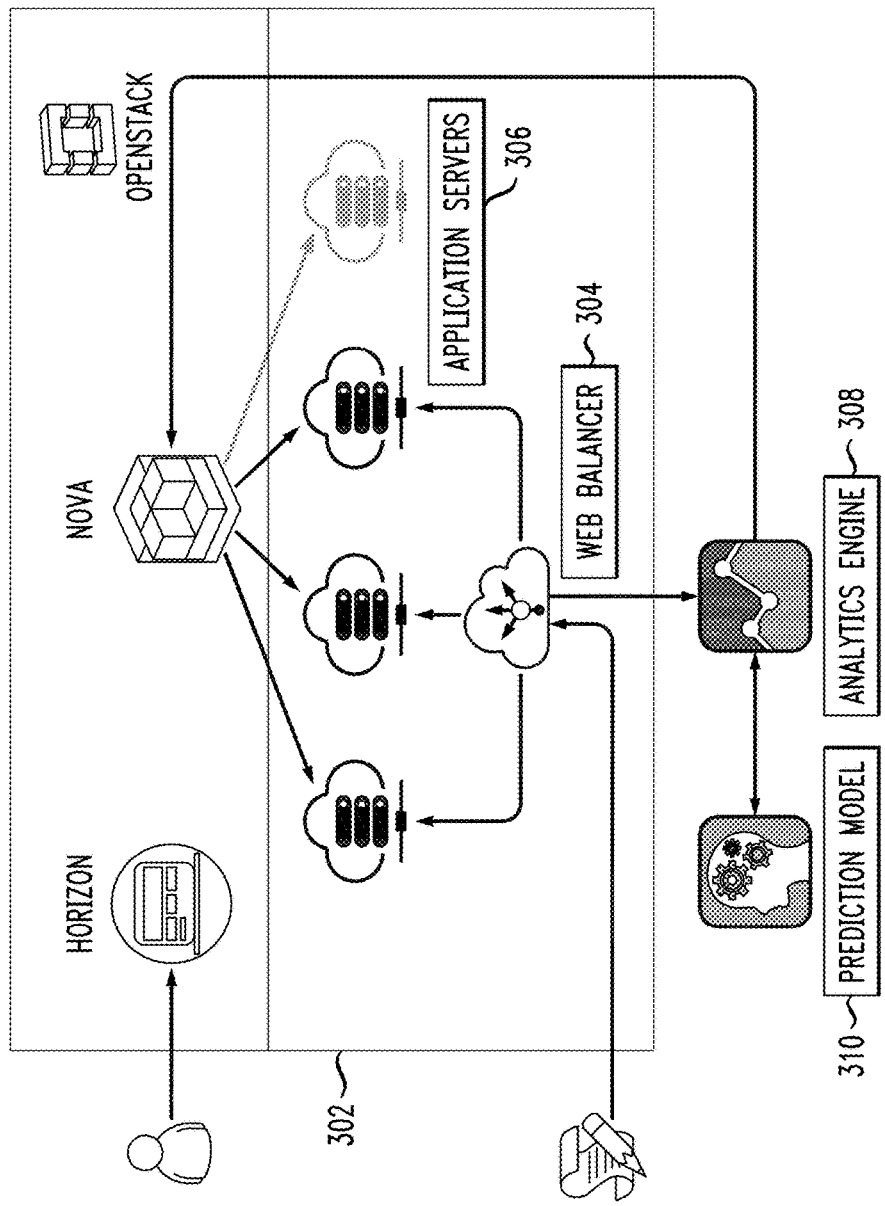
FIG. 3 illustrates an example of on-demand resource scaling, according to an embodiment of the invention.

We implemented the adaptive ensemble learning design in a real-world scenario, as shown in system 300 of FIG. 3, to provide on-demand resource scaling in a cloud platform 302, for example, a file downloading service providing by the virtual machines in OpenStack (an open-source cloud computing software platform which uses Nova as a cloud computing fabric controller and Horizon as a user dashboard). As shown, the file downloading service is provided by one web balancer instance 304 and multiple instances of file (application) servers 306.

The service provider has the responsibility to provide users with a fast and stable service. At the same time, the provider also hopes to avoid wasted resources. That is to say, in the automated cloud resource management, we need to implement the functionality of dynamic resource adjustment in accordance with changing workload.

Analytics engine 308 manages the resource usage data of each instance running user applications, and uses the data to predict workload with a prediction model 310. The prediction model is constructed and adapted via the adaptive ensemble learning techniques described herein. The final scaling decisions are sent out to dynamically adjust the instances. With the run-time resource usage data, the resource configuration is dynamically adjusted with the changing workload in a proactive way.

A set of service requests with changing user behavior patterns, such as the changing number of concurrent users and requests, are built to access the web service. In experimental testing, the static prediction model is able to provide adequate outputs in the beginning, but shows performance degradation quickly, and becomes unstable throughout the testing process. In contrast, the proposed dynamic model according to illustrative embodiments maintains a stable performance with high prediction accuracy.

Figure 4:
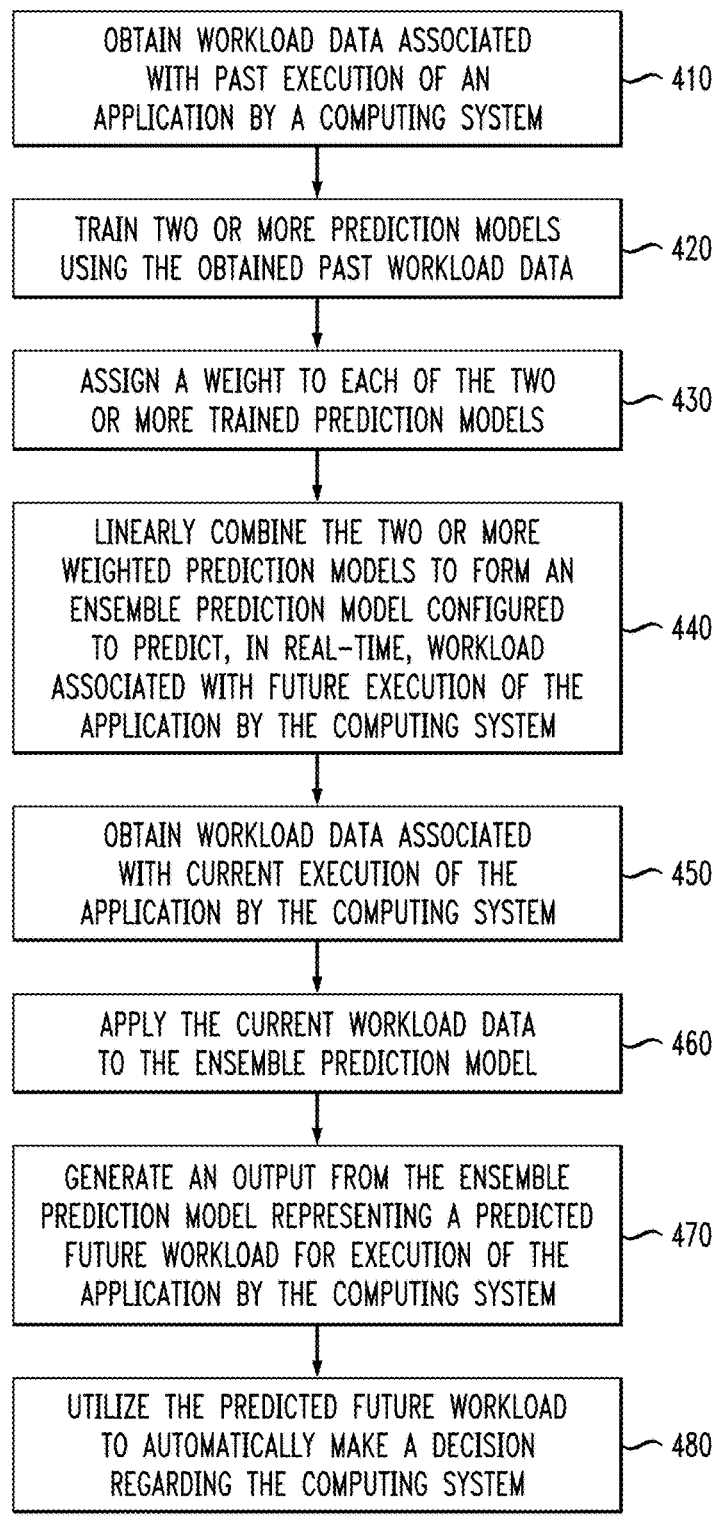
FIG. 4 illustrates a methodology for workload prediction, according to an embodiment of the invention.

FIG. 4 illustrates a methodology 400 for workload prediction, according to an embodiment of the invention.

As shown, step 410 obtains workload data associated with past execution of an application by a computing system. Step 420 trains two or more prediction models using the obtained past workload data. Step 430 assigns a weight to each of the two or more trained prediction models. Step 440 linearly combines the two or more weighted prediction models to form an ensemble prediction model configured to predict, in real-time, workload associated with future execution of the application by the computing system.

Then, step 450 obtains workload data associated with current execution of the application by the computing system. Step 460 applies the current workload data to the ensemble prediction model formed in step 440. Step 470 generates an output from the ensemble prediction model representing a predicted future workload for execution of the application by the computing system. Step 480 utilizes the predicted future workload to automatically make a decision regarding the computing system (e.g., resource scaling, scheduling, allocation, etc.).

Figure 5:
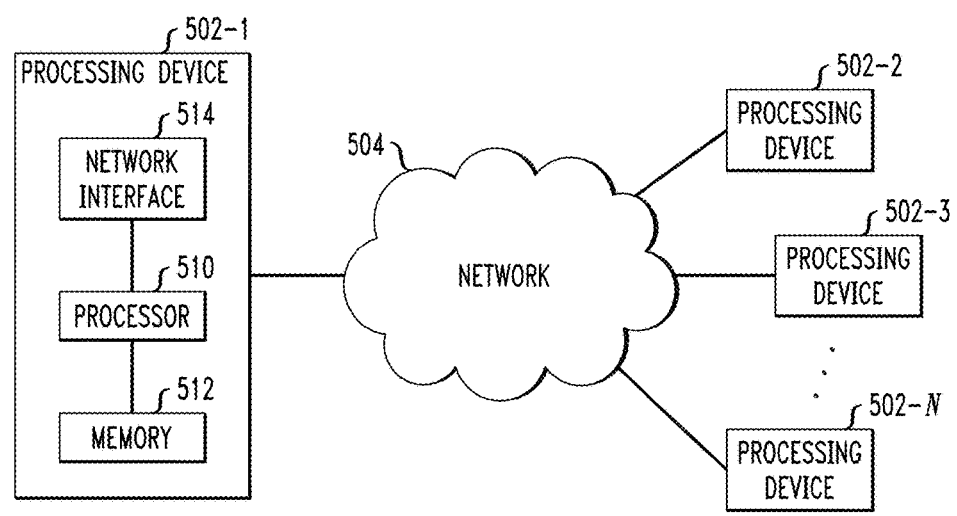
FIG. 5 illustrates a processing platform used to implement a workload prediction system, according to an embodiment of the invention.

As an example of a processing platform on which a workload prediction system (e.g., 300 of FIG. 3) can be implemented is processing platform 500 shown in FIG. 5. The processing platform 500 in this embodiment comprises a plurality of processing devices, denoted 502-1, 502-2, 502-3, . . . 502-N, which communicate with one another over a network 504. It is to be appreciated that the methodologies described herein may be executed in one such processing device 502, or executed in a distributed manner across two or more such processing devices 502. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the network 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the federated web crawling and storage system shown as 500 in FIG. 5 may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 500 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and Symmetrix VMAX (commercially available from EMC Corporation, Hopkinton, Mass.). A variety of other computing and storage products may be utilized to implement the one or more services that provide the functionality and features described herein.

It was noted above that portions of the system environment 500 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining past workload data associated with at least one past execution of an application by a computing system;
independently training two or more different prediction models using the obtained past workload data;
assigning respective weights to the two or more trained prediction models;
predicting, in real-time, a future workload associated with a future execution of the application by the computing system based on the trained prediction models;
wherein predicting the future workload in real-time comprises:
obtaining an input comprising current workload data associated with a current execution of the application by the computing system;
applying the obtained current workload data as input to each of the prediction models to generate individual outputs; and
generating a combined output representing the predicted future workload, wherein the combined output is generated as a linear combination of the individual outputs and their respective weights; and
automatically generating a resource management decision regarding the computing system by utilizing the predicted future workload;
wherein the resource management decision causes dynamic implementation of an adjustment of a resource configuration of the computing system, the adjustment of the resource configuration comprising at least one of resource scheduling and resource scaling;
wherein the steps of the method are performed by at least one processing device comprising a processor operatively coupled to a memory.

2. The method of claim 1, wherein the past workload data is obtained for a predetermined historical time window.

3. The method of claim 1, wherein the workload data comprises time-series data.

4. The method of claim 1, wherein the current workload data is obtained at a higher frequency than the past workload data.

5. The method of claim 1, further comprising:
determining whether or not the ensemble prediction model formed in a current iteration of the method is different than the ensemble prediction model formed in a previous iteration of the method; and
using the ensemble prediction model formed in the current iteration for real-time future workload prediction when the ensemble prediction models are different.

6. The method of claim 1, wherein the two or more prediction models comprise two or more different machine learning algorithms.

7. The method of claim 6, wherein a given one of the two or more different machine learning algorithms comprises one of linear regression, decision tree, and hidden Markov model.

8. The method of claim 1, wherein the computing system comprises at least part of a cloud platform.

9. The method of claim 1, wherein the computing system comprises at least part of a data center.

10. An article of manufacture comprising a processor-readable storage medium having encoded therein executable code of one or more software programs, wherein the one or more software programs when executed by one or more processing devices implement steps of:

obtaining past workload data associated with at least one past execution of an application by a computing system;

independently training two or more different prediction models using the obtained past workload data;

assigning respective weights to the two or more trained prediction models;

predicting, in real-time, a future workload associated with a future execution of the application by the computing system based on the trained prediction models;

wherein predicting the future workload in real-time comprises:

obtaining an input comprising current workload data associated with a current execution of the application by the computing system;

applying the obtained current workload data as input to each of the prediction models to generate individual outputs; and generating a combined output representing the predicted future workload, wherein the combined output is generated as a linear combination of the individual outputs and their respective weights; and automatically generating a resource management decision regarding the computing system by utilizing the predicted future workload;

wherein the resource management decision causes dynamic implementation of an adjustment of a resource configuration of the computing system, the adjustment of the resource configuration comprising at least one of resource scheduling and resource scaling.

11. The article of manufacture of claim 10, wherein the workload data comprises time-series data.

12. The article of manufacture of claim 10, wherein the computing system comprises one or more of at least part of a cloud platform and at least part of a data center.

13. An apparatus comprising: a memory; and a processor operatively coupled to the memory and configured to: obtain past workload data comprising data associated with at least one past execution of an application by a computing system;

independently train two or more different prediction models using the obtained past workload data;

assign respective weights to the two or more trained prediction models;

predict, in real-time, a future workload associated with a future execution of the application by the computing system based on the trained prediction models;

wherein, in predicting the future workload in real-time, the processor is configured to:

obtain an input comprising current workload data associated with a current execution of the application by the computing system;

apply the obtained current workload data as input to each of the prediction models to generate individual outputs; and generate a combined output representing the predicted future workload, wherein the combined output is generated as a linear combination of the individual outputs and their respective weights; and automatically generate a resource management decision regarding the computing system by utilizing the predicted future workload;

wherein the resource management decision causes dynamic implementation of an adjustment of a resource configuration of the computing system, the adjustment of the resource configuration comprising at least one of resource scheduling and resource scaling.

14. The apparatus of claim 13, wherein the past workload data is obtained for a predetermined historical time window.

15. The apparatus of claim 13, wherein the two or more prediction models comprise two or more different machine learning algorithms.

16. The apparatus of claim 15, wherein a given one of the two or more different machine learning algorithms comprises one of linear regression, decision tree, and hidden Markov model.

17. The apparatus of claim 13, wherein the workload data comprises time-series data.

18. The apparatus of claim 13, wherein the current workload data is obtained at a higher frequency than the past workload data.

19. The apparatus of claim 13, wherein the processor is further configured to:

determine whether or not the ensemble prediction model formed in a current iteration of the method is different than the ensemble prediction model formed in a previous iteration of the method; and use the ensemble prediction model formed in the current iteration for real-time future workload prediction when the ensemble prediction models are different.

20. The apparatus of claim 13, wherein the computing system comprises one or more of at least part of a cloud platform and at least part of a data center.

* * * * *